United States Patent Office 3,106,872
Patented Oct. 15, 1963

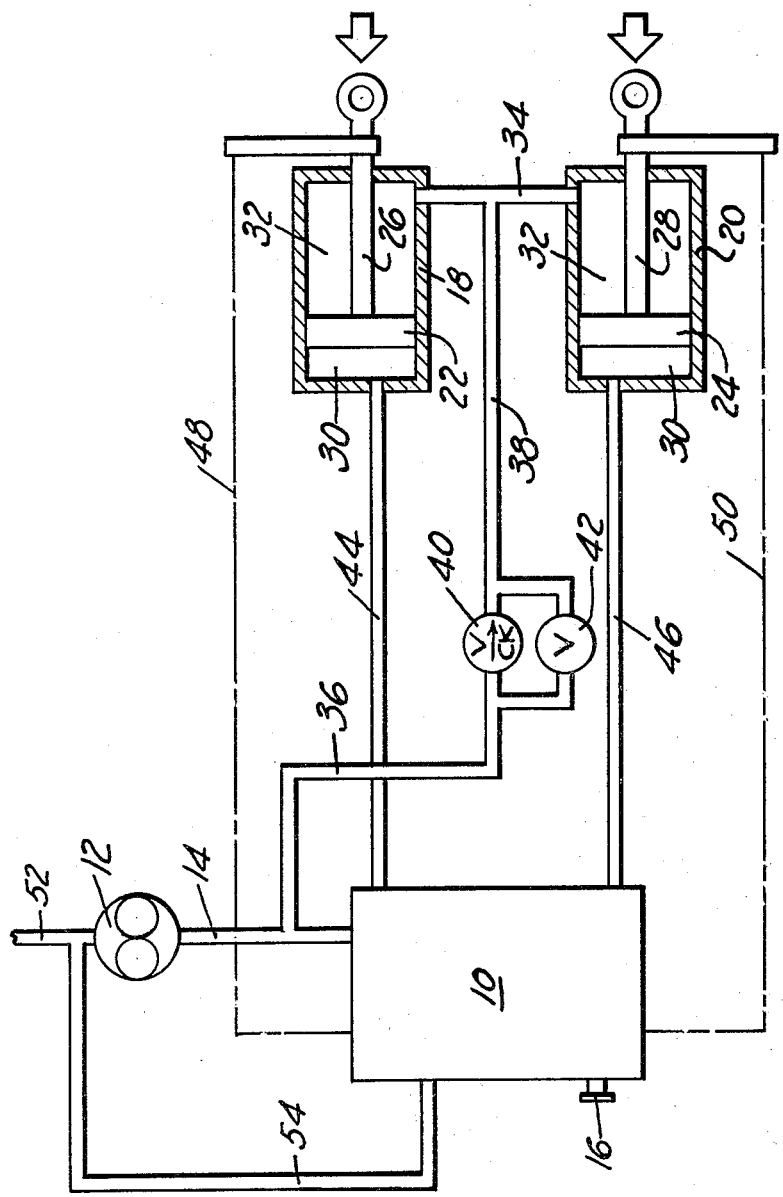

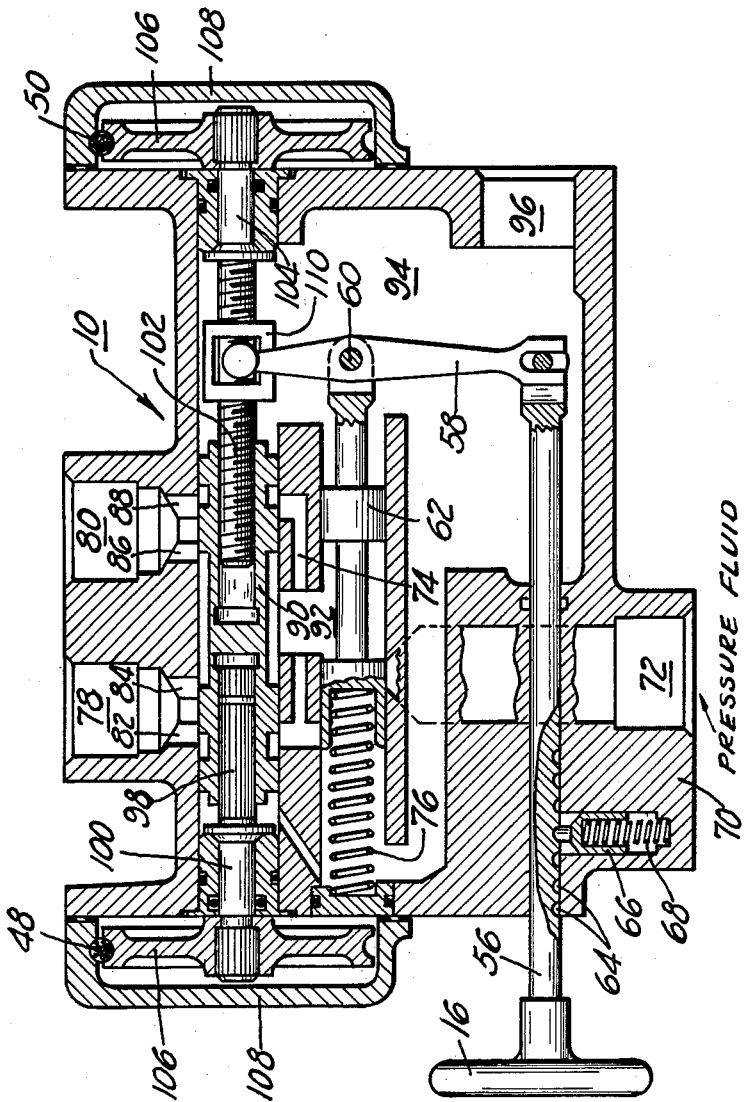

1

3,106,872
COORDINATING CONTROL UNIT
Billy S. Hegg and Robert W. McGinnis, South Bend, Ind., assignors to The Bendix Corporation, South Bend, Ind., a corporation of Delaware
Filed Mar. 12, 1962, Ser. No. 178,943
4 Claims. (Cl. 91—171)

This invention relates to a power control mechanism, and more particularly, to a means where movement of a plurality of positioning mechanisms may be coordinated to move in equal increments.

A particular object of the invention is to provide a means to control the precise adjustment of a plurality of positioning devices.

Another object of the invention is to provide a control element which will insure equal operation of any number of servomechanisms in unison.

Still another object of the invention is to provide a control or "follow-up" system in which operation of a servomechanism is communicated to control mechanism therefor and mechanically compared with the operation of another servomechanism to effectuate equal servomechanism operation.

Other and further objects may be found in the following specification and drawings in which:

FIGURE 1 is a schematic presentation of a control unit in accordance with the present invention as applied to dual servomechanism system; and FIGURE 2 is a sectional view of the control unit for such a system.

In substantially all systems utilizing a plurality of servomechanisms there is a need for a simple, lightweight readily adaptable control for not only positively positioning such servomechanisms, but for equating the degree of operation of such elements. Such systems are employed with regard to flap and dive brake actuation as well as raising and lowering objects from or to a horizontal position, to name a few.

More generally, a schematic of a system employing a plurality of servomechanisms is shown by FIGURE 1 having a control unit 10 receiving fluid under pressure from pump 12 by way of conduit 14. The control unit responds to the actuation of the control handle 16, which actuation is either toward or away from the unit 10.

A pair of actuators 18 and 20 are shown in FIGURE 1 which include pistons 22 and 24 connected with rods 26 and 28. The pistons divide each actuator into two variable volume chambers 30 and 32. Chambers 32 of each actuator are commonly connected as by conduit 34 to a flow regulating system comprising conduits 36 and 38, check valve 40 and flow limiting valve 42. In addition, the actuators 18 and 20 are connected to the control unit 10 by conduits 44 and 46, respectively, and the piston rods 26 and 28 are connected to the control unit 10 by mechanical links 48 and 50, respectively. In order to permit retraction of the piston rods the control unit is ported by means to be hereinafter described to the supply conduit 52 by a conduit 54.

With more particular regard to the control unit 10, the internal details of which are presented in FIGURE 2, the control handle 16 is connected by a rod 56 to a walking beam 58, which walking beam is pivotally connected, as at 60, to a pilot valve 62. The rod 56 is provided with a plurality of indentations 64 which cooperate with a detent 66 to hold the rod in any one of a number of positions. As seen, the detent 66 is urged into said indentations by a spring 68 within an appropriately located bore in the housing 70 of the control unit 10.

The pressurized fluid from pump 12 enters the housing 70 at the port 72, which fluid is controlled in passage through the housing by the pilot valve 62. The pilot valve 62 also controls a return passage 74. The pilot valve is held against movement by a spring 76. The actuators are operatively connected to the control unit 10 through ports 78 and 80 having passages 82 and 84 and 86 and 88, respectively. As seen in FIGURE 2, the passages 82, 84, 86 and 88 are commonly controlled by a spool valve 90, and passages 82 and 88 form return passages, whereas passages 84 and 86 serve to connect the actuators to the pressurized fluid that has entered port 72 and passed by pilot valve 62 into chamber 92. In fact, as may be seen in FIGURE 2, as soon as the pilot valve is cracked to open port 72 to chamber 92, fluid flows through ports 84 and 86 to start actuator operation, and as soon as pilot valve 62 is cracked in the opposite direction to open passage 74, fluid returns from the actuators, due to means to be hereinafter detailed, to flow into chamber 94 and subsequently out port 96 to return conduit 54.

The spool valve 90 is splined, as at 98, to a first feedback shaft 100. At the opposite end, valve 90 is in threaded relationship, as at 102, with a second feedback shaft 104. The feedback shafts are connected to reels 106 having clamps 108 holding the mechanical links 48 and 50 to the reels 106.

In operation, the degree of actuator extension is a function of control handle position and increases as the handle 16 is withdrawn from the control. Upon withdrawing the handle from the control, as when it is desirable to extend the rods 26 and 28 of the actuators 18 and 20, the walking beam 58 is pivoted to translate the pilot valve 62 to uncover the high pressure port 72. The resulting flow is equally divided between the actuators by the spool valve 90 which, as shown in FIGURE 2, is in its null position whereby the effective flow area of passages 84 and 86 established by valve 90 are equal.

The positional relationship between the two actuators is determined by comparing two mechanical feedback signals. The feedback shaft 100 acts as a driver and a slip joint; whereas the feedback shaft 104 allows the spool valve 90 to rotate about its axis. Thus, if one actuator travel exceeds the other, the valve 90 moves off the null position shown in FIGURE 2 by being axially positioned with respect to screw thread 102 of shaft 104 in a direction to reduce discharge area to the faster moving actuator to compensate for the different actuator loads and pressures by modulating discharge areas as necessary to keep the actuators moving in proper relationship to each other.

In addition, actuator travel is sensed at the walking beam 58 by a spool 110 threaded to the feedback shaft 104; whereby movement of the beam 58 by rotation of shaft 104 restores the pilot valve to its original position once the desired amount of travel, corresponding to the input request of handle 16, has been completed.

To retract the actuators, the control handle 16 is moved in towards housing 70. The walking beam 58 pivots to pull the pilot valve 62 to the right from the null position shown in FIGURE 2, closing port 72 if it is not already closed and opening passages 74 to chamber 94 to vent actuator pressure to pump inlet. Discharge from actuators 18 and 20 must first pass by spool valve 90, which valve, as in the case of actuator rod extension, functions to control return flow as a function of differential piston rod travel. As the rods 26 and 28 approach their inward limit, the nulling of the pilot valve 62 is accomplished as during extension.

Actuator velocity during load reversals is controlled by pressurizing the rod end variable volume chamber 32, and this pressurization is insured during extension by the flow limiting valve 42 which is automatically controlled, as by being referenced to ambient pressure. A one-way check valve 40 in parallel with the valve 42 permits free flow to the chamber 32 during retraction of the rods 26 and 28.

Due to statutory requirements, the foregoing description was tendered as one form this invention may take. Therefore, the forms of the invention disclosed herein should be considered as illustrative and not as limiting the scope of the following claims which truly suggest the scope of this invention.

We claim:

1. A control for at least two fluid operated servomechanisms comprising:
   a control member;
   first valve means operatively connected to said control member for controlling a flow of pressurized fluid to and from the two servomechanisms in response to movement of said control member;
   second valve means; including a valve member movable axially to simultaneously cause a relative change in flow to each of the two servomechanisms, in flow controlling relationship with said pressurized fluid operatively connected to each of the two servomechanisms and responsive to movement thereof for modifying the flow of pressurized fluid thereto and therefrom in the event that movement of one servomechanism is not coextensive with movement of the other;
   said operative connection between said second valve means and the two servomechanisms including a first shaft threadedly engaged with said valve member and rotatable relative thereto in response to movement of one of the two servomechanisms to cause axial movement of said valve member and a second shaft drivably connected to said valve member for rotating said valve member relative to said first shaft in response to movement of the other of the two mechanisms to cause axial movement of said valve member.

2. A control for at least two fluid operated servomechanisms as claimed in claim 1 wherein said first valve means is upstream from said second valve means and provided with an operative connection to one of said two servomechanisms whereby said first valve means is returned to a null position upon completed movement of said one servomechanism to block flow of said pressurized fluid to said second valve means.

3. A control for at least two fluid operated servomechanisms as claimed in claim 2 wherein said operative connection includes a lever threadedly engaged with said first shaft and pivotally connected to said first valve means and said control member such that rotation of said first shaft produces pivotal movement of said lever which, in turn, actuates said first valve to a null position.

4. A control for at least two fluid operated servomechanisms as claimed in claim 1 wherein said valve member is slidably carried for axial movement on said second shaft.

References Cited in the file of this patent

UNITED STATES PATENTS 2,376,320    Butrovich et al.          May 22, 1945

FOREIGN PATENTS 953,491    Germany               Nov. 29, 1956
746,390    Great Britain            Mar. 14, 1956